United States Patent
Liebowitz

(12) 
(10) Patent No.: US 6,690,572 B2
(45) Date of Patent: Feb. 10, 2004

(54) SINGLE LAYER ELECTRONIC CAPACITORS WITH VERY THIN DIELECTRICS AND METHODS TO PRODUCE SAME

(76) Inventor: Larry A. Liebowitz, 129 Adirondack Ave., Spotswood, NJ (US) 08884

(*) Notice: Subject to any disclaimer, the term of this patent is extended or adjusted under 35 U.S.C. 154(b) by 0 days.

(21) Appl. No.: 10/090,816

(22) Filed: Mar. 6, 2002

(65) Prior Publication Data

US 2003/0169555 A1 Sep. 11, 2003

(51) Int. Cl.[7] .............................. H01G 4/06; H01G 4/00
(52) U.S. Cl. ........................................ 361/311; 361/303
(58) Field of Search ...................... 361/301.4, 303–305, 361/311–313, 320, 321.1–321.5

(56) References Cited

U.S. PATENT DOCUMENTS

| | | | | |
|---|---|---|---|---|
| 3,689,810 A | * | 9/1972 | Walles | 361/305 |
| 3,882,059 A | * | 5/1975 | Elderbaum | 29/25.42 |
| 5,254,360 A | * | 10/1993 | Crownover et al. | 427/79 |
| 5,737,180 A | * | 4/1998 | Yoo | 361/313 |
| 6,207,522 B1 | * | 3/2001 | Hunt et al. | 438/393 |
| 6,366,443 B1 | * | 4/2002 | Devoe et al. | 361/313 |
| 6,433,993 B1 | * | 8/2002 | Hunt et al. | 361/303 |

FOREIGN PATENT DOCUMENTS

JP   P-2000-327964 A   * 11/2000

* cited by examiner

*Primary Examiner*—Dean A. Reichard
*Assistant Examiner*—Eric Thomas
(74) *Attorney, Agent, or Firm*—Leonard Cooper

(57) ABSTRACT

A SLC has a thin brittle ceramic dielectric layer less than 0.0035 inches thick and as low as 0.0005 inches or less. Electrodes are thick and strong enough either singly or together to give the structure required physical strength for manufacture, handling, and usage. Electrodes are (1) a ceramic metal composite, (2) a porous ceramic infiltrated with metal or other conductive material, (3) a resin filled with metal or other conductive material, or (4) combinations of the above. The very thin and, in itself, fragile dielectric layer provides exceedingly high capacity per unit area with temperature stability and low losses. A 0.00001-inch thick dielectric of titanium dioxide is also used.

23 Claims, 2 Drawing Sheets

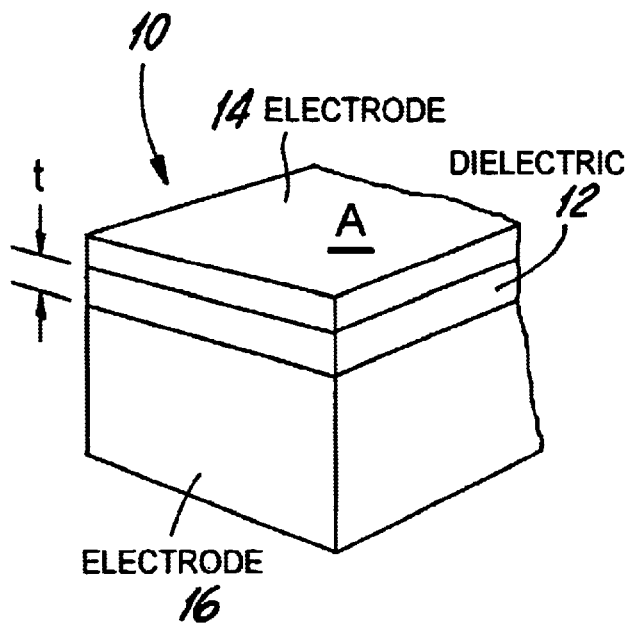
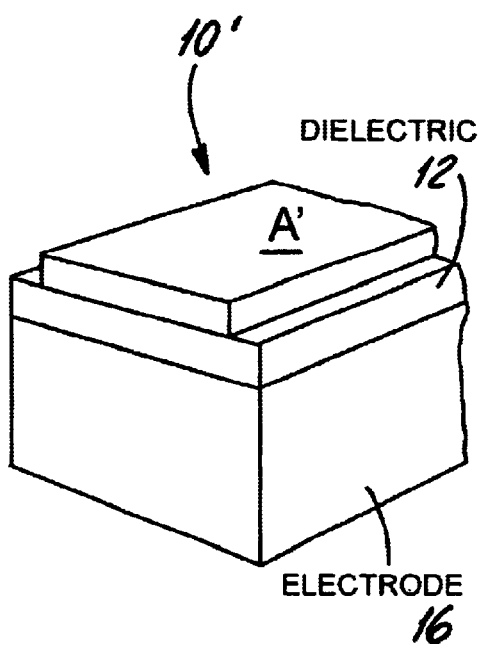
FIG.1a
FIG.1b
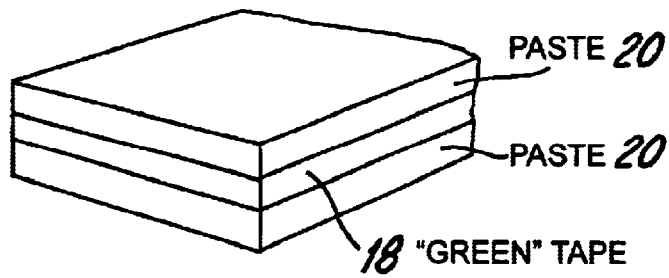
FIG.2
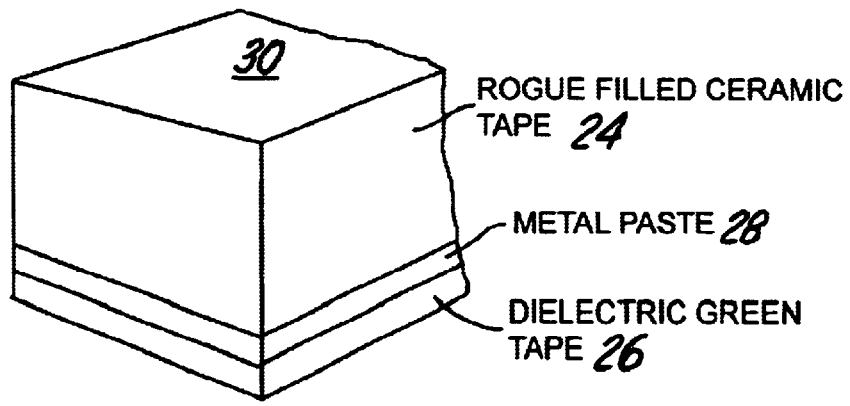
FIG.3

SINGLE LAYER ELECTRONIC CAPACITORS WITH VERY THIN DIELECTRICS AND METHODS TO PRODUCE SAME

BACKGROUND OF THE INVENTION

The simplest instance (FIG. 1a) of an electronic capacitor 10 includes a dielectric material 12 sandwiched between two metal electrodes 14, 16. More complex examples (not shown) include multi-layer devices which incorporate additional alternating layers of dielectric and electrode, electrically connected in parallel by terminations so as to cause the net capacitance value of the assembly to be equal to the sum of the values of the individual layers.

The dielectric 12 may be any electrical insulator, but required properties of the device 10 dictate which materials are satisfactory for the application at hand. One of the important properties of dielectric materials is dielectric constant (K). This property, along with the thickness (t) of the dielectric layer 12, determines the magnitude of capacitance C achievable per unit of active area A of the dielectric/electrode sandwich. When face area A is fixed, capacitance is directly proportional to the dielectric constant K and inversely proportional to dielectric thickness t. Commonly used dielectrics include mica, thin films of various oxides such as those of aluminum, tantalum and silicon, and various electronic ceramics whose dielectric constants span the range of about 6 to 20,000.

In general, it is desirable to get the highest capacitance per unit area from a given chip because of limited circuit board space, particularly in today's miniature equipment such as wireless phones and hand-held computing devices. Accordingly, this high capacitance density will be attained by choosing a material with high dielectric constant and minimum thickness. Choice of dielectric is limited by losses and temperature stability requirements so thickness becomes a critical factor.

Ceramics are one of the most useful classes of dielectric materials for present applications. However, due to their fragility and the difficulty in firing them at thicknesses much below 0.004 inch, ceramics are usually used in multi-layer form, which yields high capacitance per unit board area but also causes high inductance, an undesirable property, relative to single layer devices. This high inductance drawback also applies to devices with a single dielectric layer and one or more electrodes buried within a multi-layer structure in which electrical contact(s) to said buried layer(s) are brought to the surface through vias, edge connections, etc. The present invention avoids any of these inductance-increasing methods and in fact makes practical a classic single layer ceramic capacitor with dielectric thickness of 0.001 inch or less.

Once a given dielectric is selected the size of the resulting device for any given capacitance is conventionally determined by the number of layers and their thicknesses. True single layer capacitors (SLCs) have lower inductance and thus higher resonant frequencies than their multi-layer counterparts and, as stated, are useful at higher frequencies, a necessity for many of today's broadband, wireless and other applications. Since SLCs have a much more limited capacitance range than multi-layer devices, when area is predetermined; e.g., by a circuit configuration, it is very important to get the dielectric thickness as low as possible. True SLCs currently available are limited to about 0.004 inches in minimum thickness because of the fragility of the dielectric materials at lesser thickness.

This disclosure focuses on examples with thin ceramic dielectrics, which ceramics are by nature brittle and therefore very fragile in thicknesses below about 0.005 inch. The application discloses methods of manufacturing true SLCs with such ceramic dielectric having thickness as low as 0.0005 inch. The term "true SLC" is used to distinguish those physical embodiments and methods disclosed herein from single buried layer devices conventionally manufactured with the same design as multi-layer devices and having similar negative features.

What is needed is a physically and electrically reliable true single layer capacitor of high capacity per unit area using a thin ceramic dielectric that is less than 0.004 inch in thickness.

SUMMARY OF THE INVENTION

An SLC 10 (FIG. 1a) in accordance with the invention has a thin ceramic dielectric layer 12 (less than 0.004 inch and as low as 0.0004 inch or less), which has as electrodes conductive layers 14, 16 that are thick and strong enough either singly or together to give the structure 10 the required physical strength for manufacturing, handling and usage, and having electrical properties giving the device its required performance properties. An electrode(s) 14, 16, for example, is composed of (1) a ceramic-metal composite, (2) a porous ceramic infiltrated with metal or other conductive material, (3) a resin filled with metal or other conductive material, or (4) combinations of the above.

Thus, a very thin and in itself, fragile, dielectric layer 12 provides exceedingly high capacity per unit area, while thick, strong electrodes 14, 16 provide structural strength and support that protect the dielectric of the capacitor during manufacturing and usage.

Several exemplary methods are presented herein that are suitable for mass production of SLCs in accordance with the invention. Embodiments of the invention using an oxide of titanium as a very thin dielectric 12 are also disclosed.

BRIEF DESCRIPTION OF THE DRAWINGS

FIG. 1a is a schematic perspective partial view of a conventional single-layer capacitor SLC having coextensive electrodes; FIG. 1b is a similar SLC having one patterned electrode;

FIG. 2 illustrates partially and in perspective embodiment I of an SLC in accordance with the invention before firing;

FIG. 3 partially and in perspective illustrates embodiment II in accordance with the invention before firing;

Figure 4:
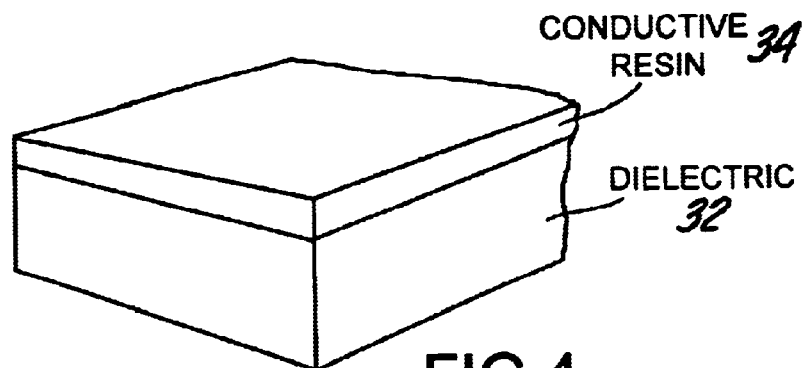
FIG. 4 partially and in perspective illustrates embodiment III in accordance with the invention before firing.

The figures are illustrative and not drawn to any scale.

DESCRIPTION OF PREFERRED EMBODIMENTS

Several basic methods are now described for producing (true SLC) capacitors, and resultant SLC products in accordance with the invention are described.

Embodiment I; Composite Electrode

A green ceramic tape 18 serves (FIG. 2) as a precursor for the dielectric layer of the finished capacitor. This green tape of desired ceramic composition was cast to proper thickness for providing the desired fired thickness, and was trimmed to whatever green substrate size is preferred.

A conductive paste 20 contains metal and ceramic powders to provide a suitable conductive electrode after firing. The metal and ceramic powders are suspended in a plastic vehicle with solvent to attain the desired viscosity. A small amount of flux (not shown) may be added to improve wetting characteristics and/or promote adhesion of the paste to the dielectric tape. The paste 20 is applied to the thin green ceramic tape 18 (the dielectric) by stencil, screen-printing or other suitable method at a thickness that will assure the physical integrity of the finished product. This paste is prepared by standard processes such as passing the ingredients several times through a three-roll mill.

The green tape and paste, as work-in-progress, are then subjected to thermal processing (firing) that results in a thin dielectric layer adhering to a conductive electrode (or two electrodes). The green tape typically shrinks 10% to 30% in a high temperature furnace depending on its composition.

Depending on the dielectric's composition and subsequent firing conditions, the metal in the paste may be either noble or non-noble. For air firing the metal may be platinum, palladium, gold, silver, alloys of these, or others that do not react with the air. Metals such as nickel and copper may be used for non-oxygen firing. Oxidation of the metal must be avoided.

The ceramic powder in the paste is, for example, a single compound or a combination of compounds. The ceramic powder can comprise metal oxides and/or titanates, similar to those used for the dielectric in other embodiments. The ratio of metal to powder in the paste can range from about 0.4 grams to 9 grams of metal per gram of powder.

The paste is precursor to one or both of the finished devices' electrodes and is initially applied to one or both sides of the dielectric green tape as required by the design of the particular device being manufactured. When the paste is applied only on one side, a thin solid or patterned layer of co-fireable metal may be applied to the other side of the tape that, when fired, becomes the counter electrode. Alternatively, the counter electrode may be applied after firing by any standard method; e.g., plating, sputtering, screen-printing, etc.

The metal powder in the paste is chosen so that it does not melt nor react with the dielectric at its sintering temperature, but forms a strong electrically conductive bond with it. The ceramic powder in the paste is selected so that it imparts physical strength to the sintered product while at the same time does not significantly diminish the electrical conductivity of the metal in the ceramic to metal ratio that is employed.

The entire paste composition is such that shrinkage of the layers' planar surfaces during the burnout/sintering process matches the shrinkage of the dielectric green tape. After application of the paste to the dielectric tape, the tape and electrode(s) paste are co-fired at the prescribed temperature for the given ceramic composition.

After the firing process with paste on only one side of the tape, the counter electrode is applied and any required desired pattern etching is done. The composite electrode may also have a thin conductive layer applied to its outer surface by methods such as plating, sputtering, etc.

The total after-firing thickness of the dielectric 12 plus two electrode layers 14, 16 should be about 0.003 inch or more (0.004 is preferred) to allow advantageous handling characteristics. After firing, the individual devices are separated by dicing and subjected to normal and customary processing. The devices 10, 10' thus formed will have, after shrinkage in firing, a thin (0.0004 to 0.0015 inch) stratum of dielectric material 12 sandwiched between adherent conductive electrodes 16 either extending to the extent of the chip surface A (FIG. 1a) or to a lesser extent A' leaving a margin of unelectroded dielectric.

Thus, devices are formed with capacitance values up to about 10 times (or more) the value of a conventional single layer device of their size, by virtue of the actual dielectric after firing being a fraction as thick as the conventional device. Capacitance is further enhanced by the fact, observable with an electron microscope, that the electrode(s) penetrate into the body of the dielectric, further reducing the effective dielectric thickness. Other properties; e.g., temperature stability, losses, of the present invention are similar to or better than those of conventional single layer capacitors. It is also possible to dice an assembly in the green or intermediate bisqued states if this timing is more suitable to a given assembly line.

Embodiment II; Porous Electrode

To form an electrode, a "rogue" material is incorporated into a suitable ceramic tape 24 (FIG. 3). The rogue material burns off during the sintering process (as described below), leaving the resultant fired material porous. Typically, this rogue material may be graphite, rice starch, finely ground walnut shells, or a host of other organic and inorganic materials. The ceramic tape 24 is formulated so that it is co-fireable with a ceramic dielectric green tape 26 and is compatible after firing as well.

One major concern is matching the shrinkages of the electrode and dielectric tapes during sintering and the as-fired thermal coefficients of expansion. Hence, the composition of the ceramic in the rogue material filled tape 24 preferably is similar to the ceramic of the dielectric tape 26. Thickness of the green dielectric tape 26 is chosen to give the desired end result capacitance per unit area and is usually between 0.0005 and 0.005 inch. Thickness of the rogue material filled tape 24 is selected to give the desired structural integrity and overall fired thickness of the finished product.

A co-fireable conductive metal paste 28 is applied to either the dielectric tape 26 or rogue material filled tape 24, or to both, in most instances by screen-printing. Dielectric and rogue material filled tapes are then laminated by conventional means, encasing the metal paste between them, and then are fired.

After the firing process, the now porous electrode layer precursor 24 is impregnated from its outer surface 30 with conductive metal (not shown) by processes such as, for example, plating, sputtering and/or osmosis, thus forming an electrical link through pores to the previously applied metal layer 28 and causing the entire "porous" layer (now filled with metal) to act as an electrode.

The counter electrode (not shown) is then applied to the opposite outer surface of the dielectric 26 by any of the means mentioned above, and the resultant wafer is diced as may be required.

Embodiment III; Metal Filled Resin Electrode

A previously fired ceramic dielectric material 32 (FIG. 4) of about 0.003 to 0.015 inch in thickness is coated on one side with a conductive metal-filled resin 34. The metal-filled resin 34 is formulated to have the least possible shrinkage during subsequent cure and to match the thermal coefficient of expansion of the dielectric material 32 as closely as is practical. Many metal and resin combinations are well known for electrode 34, the most widely used of which is silver-filled epoxy. Other metals used for this application include gold, nickel, copper, etc. as well as plated metals.

Other resins include silicones, polyesters, etc. After the filled resin is cured, the exposed side (bottom surface in FIG. 4) of the dielectric 32 is acted upon, for example, is ground down, to provide whatever thickness is required for the desired capacitance, typically under 0.001 inch. The exposed side is then electroded by one of the previously mentioned methods, and the device is diced as may be required.

Embodiment IV; Preformed Composite Electrode

This embodiment(s) (not shown) is similar to Embodiment I with the exception that the composite electrode is preformed as a flexible or rigid form of proper size and thickness, which is then laminated to the thin dielectric green tape. The electrode can be formed, for example, by casting, molding, roller milling or other method of compaction. If desired, this electrode can be formulated so as to have very low planar shrinkage during firing and at the same time limit the dielectric's planar shrinkage to a similar low amount, in effect stretching the dielectric and causing additional shrinkage in thickness, the net results of which are additional capacitance per unit area and a greater yield of devices from a given green substrate. Other processing of the capacitor is similar to Embodiment I.

Embodiment V; Surface Mount Series Capacitors

Figure 5:
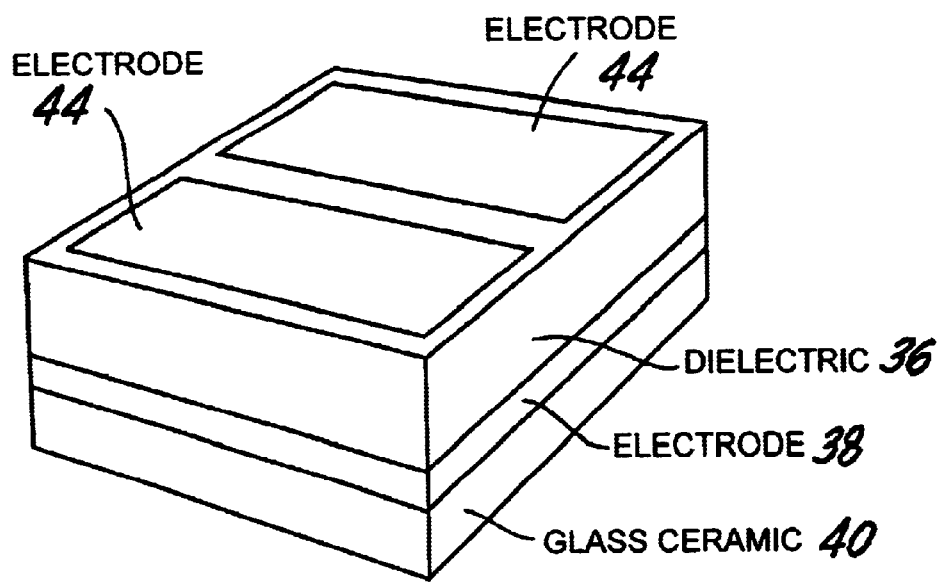
FIG. 5 illustrates embodiment V in accordance with the invention before firing.

A previously fired dielectric 36 (0.003 to 0.015 inch thick) has a thin conductive electrode 38 applied to (FIG. 5) one surface by screen-printing, stenciling, plating, sputtering, or other suitable method. This electrode may be continuous or patterned as internal "pads". If necessary, post application processing, such as firing, annealing, curing, etc. to assure good bonding of the electrode material 38 to the dielectric 36 is performed. The conductive electrode 38 is composed of noble metal(s) such as platinum, palladium, gold, etc. Silver, or base metals such as nickel or copper, for example, may also be used.

A layer 40 of unfired glass ceramic, formulated so as to exhibit minimum shrinkage during sintering, is applied to the metallized (38) side of the dielectric 36, the minimum thickness (typically 0.003–0.004 inch) of said glass ceramic layer being such that it supports the dielectric layer 36 during subsequent processing as well as handing and installation by the user. As long as this structural requirement is met, the thickness of this glass ceramic layer can be as desired.

After application of the glass ceramic, the combination is fired at the proper temperature to fully sinter the added layer 40 and permanently bond it to the dielectric 36. The firing temperature, which can be as low as 400 degrees C., determines which material(s) is selected for the inner electrode 38. After firing, the bare side 42 of the dielectric is acted upon, for example, ground down to provide the desired thinness.

The counter electrode 44 (shown with hatched lines) is then applied by any of the standard methods; e.g., plating, sputtering, screen or other printing techniques, etc. to the exposed (ground off) surface to give the desired series capacitor configuration. Chemical etching, lasering, ion milling, air or water abrasion, surface grinding or other techniques may also be employed to get the desired external electrode patterns in the counter electrode 44.

In an Embodiment VI (not shown), a prefabricated conductive electrode of proper finished dimensions is laminated (as in Embodiment IV) to a thick dielectric ceramic layer (0.003 to 0.015 inch). After they are joined, the exposed face of the dielectric is worked; e.g., ground off, to the desired layer thickness t and a counter electrode is added to the exposed face by any of the above-mentioned techniques.

The embodiments I to VI, when complete, result in structures as illustrated schematically in FIGS. 1a, b, although an external glass ceramic layer not shown in FIGS. 1a, b is included in Embodiment V when complete.

It will be apparent to those of only moderate skill in the art that, in use, each electrode of a capacitor must be electrically connected into a circuit. Frequently, the physically tiny capacitors, such as in the present invention, are flush-mounted with one electrode bonded directly to a conductive substrate. Various locations are used in connecting to the other electrode. Capacitors in accordance with the invention may be smaller than a grain of sand.

In the present invention, the electrodes are each substantially planar, each having an inner surface adjacent to a planer surface of the dielectric and each electrode having an outer surface A, A' (see FIGS. 1a, b) that is substantially parallel to it inner surface. To achieve the advantages of the present invention; e.g., greatly enhanced capacity per unit area, the connection of at least one electrode to an external circuit is made by connection to the outer surface A, A' of that electrode. Thus, the manufacturing process can leave or later provide an exposed portion on the outer surface A, A' for such connection. The circuit designer determines whether such portion remains exposed after the connection is complete. For practical design considerations in producing the exposed portion, at least one dimension of the outer electrode surface is made equal to or greater than approximately 0.004 inches in consideration of present manufacturing techniques and performance requirements. Of course, changes in these parameters will likely occur in the future.

Conventional single layer capacitors of the parallel layer construction of electrodes and dielectric generally have a dielectric thickness in the order of 0.003 inch and greater. The great advantage of the present invention, increased capacitance per unit area, results from a thinner ceramic dielectric layer that can be in the order of 0.0005 inch. The invention is noticeably advantageous when dielectric thickness t is in the range of approximately 0.0025 inch and less, for example, 0.0005 inch. The capacitors with thin ceramic dielectric in accordance with the invention have also demonstrated improved temperature characteristics and low losses as compared with prior art SLCs of similar dimensions.

An example of the method is now described to produce a capacitor of Embodiment I.

Preparation of the Electrode Precursor

Blend 52 parts by weight (pbw) of fine (1 micron) platinum powder and 22 pbw Ferro Corp. (Penn Yan, N.Y.) dielectric powder X5000 into 26 pbw of a saturated solution of ethyl cellulose in kerosene.

Preparation of the "Green" Dielectric Tape

Mix the following ingredients in a 1000 cc porcelain mill jar with 500 cc of ¼-inch diameter by ¼-inch length porcelain cylinders:

96 g Air Products (Allentown, Pa.) Airvol 21–205 polyvinyl alcohol 6.6 g Triethylene Glycol 0.6 g Air Products Dynol 604 surfactant 1.2 g Glacial Acetic Acid 150 g Ferro Corp. X5000 dielectric powder 46.5 g distilled water Roll mixture for 48 hours at 100 rpm.

Discharge mixture ("slip") and cast as follows:

1. Put container with slip into vacuum chamber. Close chamber and turn pump on. Adjust for vacuum of 27±1 inches of Hg. Deair (operate pump) for 30 minutes.

2. Set the Doctor Blade to 0.001 and cast on polypropylene film at a rate of 0.75 inch/second. Allow to dry.

3. Peel cast tape from film.

As is well known in the art, a Doctor Blade is a callibrated slit through which flows the liquid "slip", the precursor to green tape. The height of the slit determines the thickness of the green tape.

Manufacture of Capacitors

1. Cut green tape into 2 inch by 2 inch sections.

2. Stencil previously prepared electrode precursor onto 2×2 section, completely covering one surface with a 0.004-inch thick layer of electrode precursor.

3. Dry in oven at 80 degrees C. for 4 hours.

4. Fire in programmable furnace as follows:
   a. Bring temperature from room temperature to 2375 degrees F. at 2 degrees F. per minute.
   b. Hold for 2 hours at 2375 degrees F.
   c. Turn heat off and allow to cool to room temperature in closed furnace.

5. Sputter each side with metal as follows:
   a. 10 micro inch titanium-tungsten
   b. 30 micro inch nickel
   c. 80 micro inch gold 6. Dice to specified chip size.

Embodiment VII; Titanium Dioxide Dielectric

Titanium dioxide has a dielectric constant of only 90, but using the methods of the disclosed invention titanium dioxide can be applied in thickness as low as 0.00001, which yields an effective K of 36,000 relative to the 6–20,000 in a conventional device. Even at dielectric thickness of 0.00005, the subject device has an effective K of 7200, which is 80 percent higher than most conventional devices. In addition, the subject dielectric has DF of less than 0.005, which is very important at microwave frequencies, and temperature dependence of capacitance of about ±7.5% over the temperature range, about half that of the conventional device.

Figure 6:
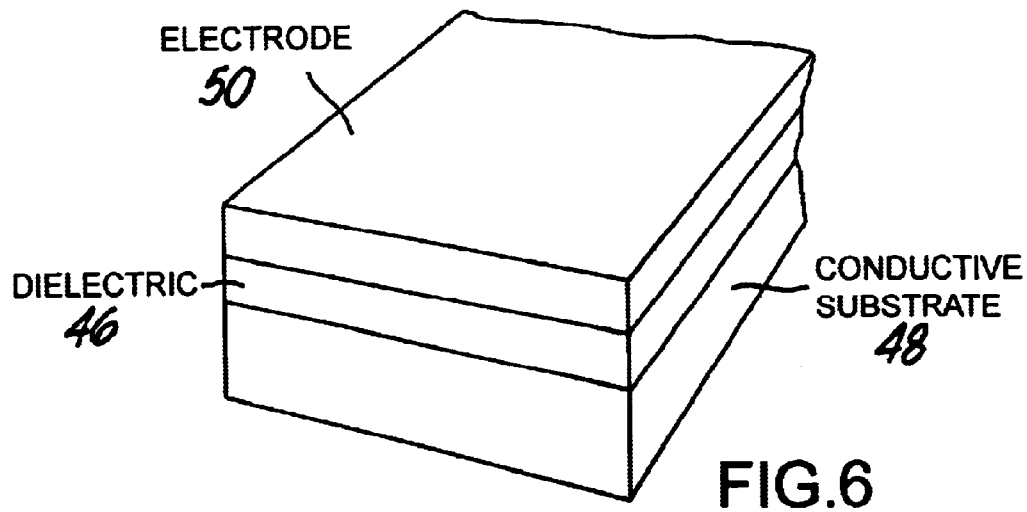
FIG. 6 illustrates embodiment VII in accordance with the invention.

An SLC in accordance with the invention (FIG. 6) is made by applying a thin layer 46 of titanium dioxide dielectric onto a conductive substrate 48 of proper thickness for the device being constructed, the substrate also being one of the device's electrodes. Then, the counter electrode 50 is applied atop the dielectric layer.

The conductive substrate 48, for example, can be composed of a metal of high conductivity which will not melt and will resist oxidation at temperatures as high as 700 degrees C.; e.g., silver or a noble metal, a porous ceramic infiltrated with metal with the same properties as above, a conductive ceramic-metal composite, or combination of the above. The counter-electrode can be a pure metal or combination of metals, metal ceramic composite, metal polymer (epoxy, polyester, etc.) composite, conductive polymer, etc., the requirement for any of the above being high electrical conductivity.

In the method of the invention, a thin layer 46 of titanium is deposited on the conductive substrate 48 by sputtering, by evaporation, by electro or electroless plating, or other suitable means. The layer 46 has a thickness to yield the specified dielectric thickness after the next step, which is conversion of the deposited layer to titanium dioxide by subjecting the Ti to oxygen at about 650 degrees C. After the conversion to titanium dioxide dielectric is complete, the counter electrode 50 is applied by vapor deposition, electro or electroless plating, screen-printing, or other suitable method. For particular applications, it may be desirable to apply intermediate layers (not shown) between the dielectric and substrate and/or counter electrode as penetration barriers, adhesion promoters, etc. It may also be desirable to bake or otherwise process the finished substrate to achieve optimum properties.

After any such processing is completed, any desired pattern etching of the electrodes is done and the material is diced into finished chips, per FIGS. 1a, b.

In summary, the problems related to the fragility of thin ceramic dielectric are overcome by supporting the ceramic dielectric before it is made thin in the production process. This is basically accomplished by connecting precursor dielectric material or thick prefinished dielectric material to a thick strong electrode element before or concurrently with thickness reduction of the dielectric material. If the initial conductive electrode material is thin, it is reinforced during manufacture of the SLC with a resin or glass ceramic so that the thin dielectric is never without adequate structural support.

What is claimed is:

1. A single-layer capacitor (SLC), comprising:

a first conductive electrode having a first planar face area;

a second conductive electrode having a second planar face area, said face areas being parallel one to the other;

a brittle dielectric layer having a first planar surface and a second planar surface parallel to said first planar surface;

said first planar face area of said first electrode being in contact with said first planar surface of said dielectric layer with low electrical resistance between them, said second planar face area of said second electrode being in contact with said second planar surface of said dielectric layer with low electrical resistance between them, wherein said brittle dielectric has a thickness t between said first and second planar surfaces less than approximately 0.0025 inches, and said first electrode and said second electrode each having a second face area, at least a portion of each said second face area being externally exposed for making an external electrical connection directly without a via to said exposed electrode portion, said second face area of at least said first electrode being substantially parallel to said first face area of said first electrode, the sum of thicknesses of said first and second electrodes being greater than said dielectric thickness t to structurally support said brittle dielectric layer against breakage.

2. A capacitor as in claim 1, wherein at least one dimension of said second face is approximately equal to or greater than 0.004 inches.

3. A capacitor as in claim 1, where said dielectric layer and said first and second electrodes each has a respective thickness, and a total thickness of said dielectric and two electrodes at least equals approximately 0.003 inches.

4. A capacitor as in claim 3, wherein said dielectric layer is ceramic.

5. A SLC as in claim 4, wherein at least one said conductive electrode includes a metal and a ceramic material, said metal and ceramic material being powders in said paste prior to said firing process.

6. A SLC as in claim 4, wherein said capacitor is the product of a method comprising the steps of:

a) providing a green tape including ceramic material for comprising said dielectric layer;

b) coating a first planar surface of said green tape with a paste including electrically conductive material for comprising said first electrode;

c) firing said coated green tape in a prescribed firing process that converts said tape and said paste into said dielectric layer and said first electrode respectively;

d) applying one of a thin solid and patterned layer of electrically conductive material to said dielectric layer opposite to said first electrode to comprise said second electrode.

7. A SLC as in claim 6, wherein at least one said conductive electrode includes a metal and a ceramic material, said metal and ceramic material being powders in said paste prior to said firing process.

8. A SLC as in claim 4, wherein said capacitor is the product of a method comprising the steps of:
   a) providing a green tape including ceramic material for comprising said dielectric layer;
   b) coating two opposed planar surfaces of said green tape with a paste including electrically conductive material for comprising first and second planar electrodes;
   c) firing said coated green tape in a prescribed firing process that converts said tape and said paste into said dielectric layer and said first and second electrodes respectively.

9. A SLC as in claim 8, wherein at least one said conductive electrode includes a metal and a ceramic material, said metal and ceramic material being powders in said paste prior to said firing process.

10. A SLC as in claim 4, wherein said capacitor is the product of a method comprising the steps of:
    a) providing a green tape including ceramic material for comprising said dielectric layer;
    b) applying one of a thin solid and patterned layer of pre-finished electrically conductive material to one side of said dielectric green tape to comprise said first electrode;
    c) coating an opposing planar surface of said green tape with a paste including electrically conductive material for comprising said second electrode;
    d) firing said coated green tape in a prescribed firing process that converts said tape and said paste into said dielectric layer and said second electrode respectively.

11. A SLC as in claim 4, wherein said capacitor is the product of a method comprising the steps of:
    a) providing a ceramic tape including rogue material that burns off when said tape is fired leaving a porous material;
    b) providing a green tape including ceramic material for comprising said dielectric layer;
    c) laminating together said ceramic tape with rogue material and said green tape with a layer of conductive metal paste between them, said metal paste being applied to at least one of said tapes prior to said lamination;
    d) fire said laminated assembly to join said layers, shrink said green tape, and render porous said ceramic tape with rogue material;
    e) impregnate said porous material with conductive metal to form said first electrode;
    f) apply a conductive material to said dielectric to form said second electrode parallel to said first electrode.

12. A SLC as in claim 4, wherein said capacitor is the product of a method comprising the steps of:
    a) providing a dielectric sheet having first and second sides and a thickness greater than said dielectric thickness t of SLC when finished in manufacture;
    b) coating said first side of said dielectric sheet with a conductive metal-filled resin to serve as said first electrode;
    c) curing said conductive resin to join said resin to said dielectric sheet;
    d) reducing said thickness of said dielectric sheet to t by processing said second side of said sheet;
    e) applying an electrically conductive layer to said second side of said dielectric sheet to serve as said second electrode.

13. A SLC as in claim 4, wherein said capacitor is the product of a method comprising the steps of:
    a) providing a dielectric sheet having first and second sides and a thickness greater than said dielectric thickness t;
    b) coating said first side of said dielectric sheet with a conductive metal-filled paste to serve as said first electrode;
    c) firing said conductive paste and dielectric to join said first electrode to said dielectric sheet;
    d) reducing said thickness of said dielectric sheet to t by processing said second side of said sheet;
    e) applying an electrically conductive layer to said second side of said dielectric sheet to serve as said second electrode.

14. A SLC as in claim 4, wherein said capacitor is the product of a method comprising the steps of:
    a) providing a green tape having first and second sides including ceramic material for comprising said dielectric layer;
    b) applying one of a thin solid and patterned layer of electrically conductive material in a finished condition to one side of said dielectric layer to comprise said first electrode;
    c) coating said second side of said green tape with a paste including electrically conductive material for comprising said second electrode;
    d) firing said coated green tape in a prescribed firing process that converts said tape and said paste into said dielectric layer and said second electrode respectively.

15. A SLC as in claim 4, wherein said capacitor is the product of a method comprising the steps of:
    a) providing a pre-fired dielectric sheet having two sides and a thickness greater than said dielectric thickness t;
    b) applying a thin electrically conductive layer to one side of said dielectric sheet to serve as said first electrode;
    c) coating said one side of said dielectric sheet and said conductive layer with a non-conductive unfired glass ceramic;
    d) curing said non-conductive glass ceramic to join said glass ceramic to said dielectric sheet and said first electrode;
    e) reducing said thickness of said dielectric sheet to t by processing said other side of said dielectric sheet;
    f) applying an electrically conductive layer to said other side of said dielectric sheet to serve as said second electrode.

16. A SLC as in claim 3, wherein said dielectric is titanium dioxide.

17. A SLC as in claim 16, wherein said capacitor is the product of a method comprising the steps of:
    a) providing a planar conductive electrode to serve as said second electrode;
    b) applying a layer of titanium to a first face of said conductive second electrode;

c) converting said titanium layer to titanium dioxide in a process including heating in an oxidizing atmosphere;

d) applying an electrically-conductive layer to an exposed planar surface of said titanium dioxide to serve as said first electrode.

18. A SLC as in claim 17, wherein said thickness of said dielectric does not exceed approximately 0.00015 inches.

19. A SLC as in claim 3, wherein said thickness of said dielectric does not exceed approximately 0.00015 inches.

20. A SLC as in claim 19 wherein said dielectric is titanium dioxide.

21. A SLC as in claim 1, wherein at least one said conductive electrode includes a metal and a ceramic material, said metal and ceramic material being powders in said paste prior to said firing process.

22. A capacitor as in claim 1, wherein said dielectric layer is ceramic.

23. A SLC as in claim 1, wherein said thickness of said dielectric does not exceed approximately 0.00015 inches.

* * * * *